July 16, 1929.    W. B. CHURCHER    1,721,177
ELECTROMAGNETIC RELAY
Filed Jan. 29, 1926
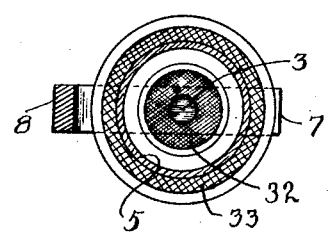
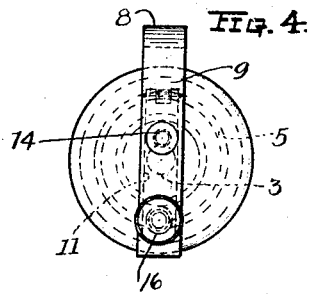
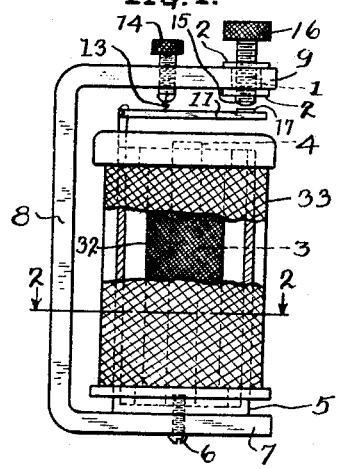
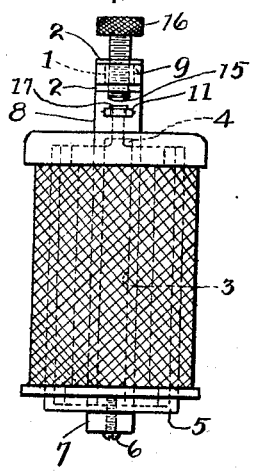
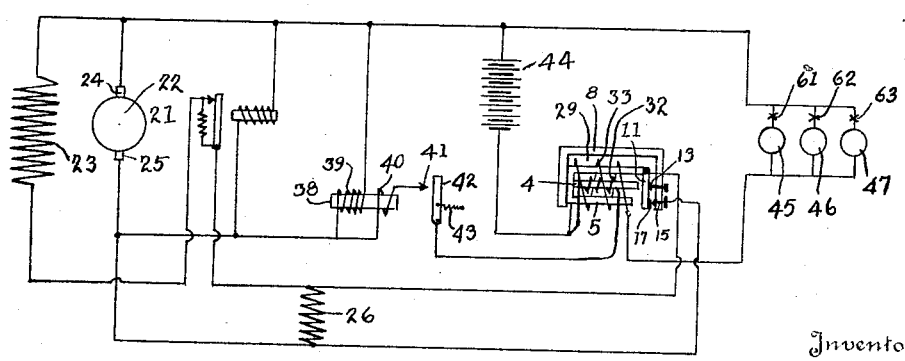
Inventor
William B. Churcher
By Frank M. Slough
His Attorney Patented July 16, 1929.

1,721,177

UNITED STATES PATENT OFFICE.

WILLIAM B. CHURCHER, OF CLEVELAND, OHIO.

ELECTROMAGNETIC RELAY.

Application filed January 29, 1926. Serial No. 84,635.

My invention relates to electromagnetic relays and relates particularly to electromagnetic relays having a plurality of windings, each adapted to receive energizing current varying from the current in the other winding.

My present invention has a particular application in electric systems for the charging of storage batteries, and particularly in such systems of the device applicable to be installed on motor vehicles, for the purpose of charging the storage battery carried by the vehicle, by means of an engine driven generator, which generator may be operated at varying speeds. In such systems, it is a common condition to have a very high discharge rate from the storage battery for considerable periods, and during part of which periods the motor vehicle is operated at a low speed or is at a standstill. In systems of the above type, now commonly in use, the charging of the storage battery is improperly regulated and the storage battery is injured by being overcharged during certain periods and undercharged at other periods, either or both of which have a very deleterious effect upon the life of the storage battery.

An object of my invention, therefore, is to provide an electromagnetic relay device, which, while capable of being applied to various types of electrical systems, has a particular use in an electrical system for a motor vehicle of the different types, which will operate to so govern the charging rate to the storage battery that substantially the proper amount of current will be supplied to the storage battery at all times, the relay so operating under the varying conditions met in practice that the rate of charging current delivered to the storage battery will be such as to keep the storage battery properly charged and without injuring the same.

Another object of my invention is to provide an electromagnetic relay of a highly efficient type, comprising an armature whose action can be controlled in a predetermined way, according to the varying currents flowing through a plurality of the relay windings.

Another object of my invention is to provide a relay having a plurality of windings of a highly efficient type, which is simple in construction and which may be manufactured commercially in quantities with substantial uniformity of operation in the different specimens of the resilient product.

Other objects of my invention and the invention itself will be apparent from the description of an embodiment thereof, which follows, and in which description reference is had to the accompanying drawings.

Referring to the drawings, illustrating an embodiment of my invention and a system in which the said embodiment may be advantageously employed:

Fig. 1 shows a relay embodying my present invention in side elevational view, a portion of the outer one of its windings being shown as broken away to reveal the inner parts, comprising a cup-shaped core and an electromagnetic winding enclosed thereby;

Fig. 2 shows a transverse cross section taken on the line 2—2 of Fig. 1;

Fig. 3 shows a front elevational view of the relay of the foregoing figures;

Fig. 4 shows a plan view of the said relay; and

Fig. 5 shows, diagrammatically, an electrical charging system for storage batteries, in which the relay of my invention may be advantageously employed.

Referring now to all of the figures of drawing, in each of which like parts are designated by like reference characters, at 3 I show a central core having a pole face 4, the core 3 being placed axially within a cup-shaped core element 5 and secured by a machine screw 6 which passes through an opening in the bottom of the cup 5 and is screw threaded within the lower end of the core 3 to clamp the core at its lower end to the center of the inner wall of the cup-shaped core. A return pole piece 8, having an arm 7 and an arm 9, is at the same time secured to the aforesaid cores by the same machine screw 6, which passes through the arm 7 of the said return pole piece. The intermediate portion of the return pole piece 8 is adapted to extend longitudinally of and parallel with but spaced from the inner core 3 and the side walls of the cup-shaped core 5. The return pole piece 8 is substantially U-shaped and carries in its transverse arm 9 an electrical contact screw 16 which passes through the arm 9 but is insulated therefrom by a pair of washers on either face of the arm shown at 2 and a bushing 1 surrounding the screw and insulating it from the walls of the perforation through the arm 9. The contact screw 16 carries an electrical contact 15 at its lower end. A spring 13, secured at both ends to the armature 11 and adjusting screw 14, respectively, will retard or resiliently press the armature 11, depending upon the adjusted position of the screw 14. An adjusting screw 14, screw threaded through the return pole piece arm 9, is adapted to be reciprocated to increase or decrease the tension exerted on the spiral spring 13, which spring is secured at one end to the armature 11 and at the other end to the end of the screw 14. The armature 11 is disposed across the pole face 4 and transversely of the core 3 having the said pole face, and is disposed intermediate of the said pole face and the upper end or rim of the main portion of the cup element 5. In the embodiment illustrated, the armature 11 is shown normally disposed with its carried contact 17 pressed against the contact 15, carried by the return pole piece arm 9 and arranged parallel with the arm 9 and approximately midway between the said arm and the pole face 4 of the core 3.

Referring now to the electrical system, in which my invention may be advantageously employed and which is illustrated, diagrammatically, in Fig. 5, at 21 I show an electrical apparatus having an armature 22 and a shunt field winding 23, collector brushes 24 and 25 for the armature, and a series resistance coil 26 in the circuit of the field winding 23. At 15 and 17, I show a pair of relay contacts adapted, when closed, to shunt the resistance winding 26 from the circuit of the field winding 23. The relay contacts 15 and 17 are operable by motion of the relay armature 11 of the relay 29, which relay is illustrated more in detail in Figs. 1 to 4, inclusive, and which has been previously described. The said relay has a pair of stationary poles 4 and 9 and the movable armature 11 adapted to play between the said poles, the relay 29 being energized variably, according to the current flowing through its windings 32 and 33. The winding 32 is placed on the more centrally disposed inner core 3 of the relay and the winding 33 is placed over the cylindrical portion of the cup-shaped core 5, and also over the enclosed centrally disposed core 3. The return pole piece 8 has no winding placed thereon. The winding 33 is made with a sufficiently large longitudinally disposed opening, that it may be placed over the outside of the cup-shaped core 5, and is concentric with and encloses the contained winding 32. The armature 11 is normally drawn by a spring 13 against the stationary contact 15 of the contact set comprising the adjustable contact 15 and the armature carried contact 17.

At 38 I show a cutout relay which may be of the usual charging circuit type and which comprises a winding 39 bridged across the armature 42, being connected to the collector brushes 24 and 25, and a second winding 40 serially connected in the charging circuit comprising the generator armature 21, the winding 32 of the relay 29, which winding 32 is of a relatively very low resistance, the storage battery 44 and circuit conductors interconnecting the above recited elements serially in the charging circuit. The winding 39 of the cutout relay 38 is of relatively high resistance to the low resistance winding 40 in the charging circuit and is adapted to be connected in the charging circuit when the same is completed by the closing of the relay contacts 41, which normally are open but which are adapted to be closed whenever the armature 42 is attracted by the combined energizing effect of the relay windings 39 and 40, that is, when these windings have a sufficient cumulative magnetizing effect upon the relay core. A retractile spring 43 withdraws the armature 42 to open contact position whenever the magnetic effect of the relay core is less than the retractile effect of the spring. The magnetizing effect of the winding 40 is additive to the magnetizing effect of the winding 39 only when the generator is developing current at a sufficient voltage higher than the voltage of the storage battery 44, at which time charging at a substantial rate will result. The winding 33 of the relay 29 is also a low resistance winding, being connected serially in the supply circuit of the current-consuming devices 45, 46 and 47, which are adapted to be inserted or removed from the circuit of the storage battery 44 by the operation of the switches 61, 62 and 63.

The arrangement of the cores, the return pole piece, the armature and windings on the said cores, is such that whenever the winding 32 alone is energized the pole face of the core will attain a degree and polarity of magnetization, depending upon the strength of current through the winding and its direction of flow, and the effect of such current will be to oppositely magnetize the rim portion of the cup-shaped core 5, which rim portion carries the armature 11, which also will be oppositely magnetized to the adjacent pole of the core 3. Likewise, the portion 9 of the return pole piece 8, which portion likewise comprises a magnetic pole, will be oppositely magnetized to the more contiguous pole face of the relay core 3. Therefore, if the direction of flow of current through the winding 32 is such as to make the pole face of core 3 a north pole, the armature 11 and the pole 9 will be south poles of the magnet. An electromagnetic attraction will be exerted upon the armature 11 by the pole of the core 3, and the pole 9 will exert a repelling magnetic influence upon the said armature.

Now, assuming the winding 32 to be magnetized, as above stated, if current flows through the winding 33 by the connecting of one or more of the current-consuming devices 45, 46 and 47, which may be electric lamps, by the closing of one or more of the switches 61 to 63, inclusive, the magnetizing effect of the said relay winding 33 will be opposite in its effect upon the core to that effect produced by the winding 32, but will have a like magnetizing effect upon the armature 11 and return pole 8, whereby upon a predetermined flow of current through the winding 33, the armature 11 will be attracted towards the return pole 9 of the pole piece 8 and will reclose the contacts 15 and 17. In the system of Fig. 5, this will short circuit the resistance winding 26 in the generator field circuit and will accomplish the delivery of current from the generator at a higher rate to compensate for the extra load placed upon the generator by the inclusion of the current-consuming devices 45 to 47. inclusive, in its circuit. Should charging be discontinued while the current-consuming devices are in circuit with the storage battery, only the winding 33 will be effective upon the cores and armature, the contacts 41 of the relay 38 in the circuit of winding 32 being broken.

Under such a condition, the adjacent poles of the armature 11 and of the core 3 will be magnetized to the same polarity, and that of the pole 9 of the return pole piece 8 to an opposite polarity to effect attraction upon the armature 11 by the pole 9 to maintain contacts 15 and 17 closed. This will have the beneficial effect of lowering the resistance of the generator field circuit so that when the generator is again subsequently operated, it will start charging of the battery at a relatively high rate, and if at any time the current-consuming devices are excluded from the storage battery circuit, the winding 32 will only be effective to reduce the charging rate, if at the time charging is being accomplished.

Having thus described my invention in a specific embodiment, I am aware that numerous and extensive departures may be made from the invention herein illustrated and described but without departing from the spirit of my invention.

What I claim is:

1. In a relay, a bifurcated core therefor and a core extension extending from the yoke portion of the core and comprising, in at least a portion of its length, a relay armature disposed between the free ends of the core forks, and a pair of magnet windings, one encircling one arm of the core, and the other encircling said arm and said core extension, and a pair of relay contacts adapted to be operated when the armature is moved in a direction toward one of the limbs.

2. In a relay, a bifurcated core therefor and a core extension extending from the yoke portion of the core and comprising, in at least a portion of its length, a relay armature disposed between the free ends of the core forks, and a pair of magnet windings, one encircling one arm of the core, and the other encircling said arm and said core extension, and a pair of relay contacts adapted to be operated when the armature is moved in a direction toward one of the limbs, said core extension being in the form of a tube telescoped over the wound core limb, said second winding being disposed over the exterior of the tube.

3. In a relay, a bifurcated core therefor and a core extension extending from the yoke portion of the core and comprising, in at least a portion of its length, a relay armature disposed between the free ends of the core forks, and a pair of magnet windings, one encircling one arm of the core, and the other encircling said arm and said core extension, and a pair of relay contacts adapted to be operated when the armature is moved in a direction toward one of the limbs, said core extension being in the form of a cup, said wound core limb being telescoped within the cup and an end of the wound core limb being joined together with an end of the other limb, said other limb extending by a free end beyond the free ends of the wound core limb, and the rim of the cup-shaped extension, said second winding being disposed over the outer surface of said cup-shaped core extension.

In testimony whereof I hereunto affix my signature this 29th day of December, 1925.

WILLIAM B. CHURCHER.